(12) United States Patent
Yamanaka et al.

(10) Patent No.: US 6,338,232 B1
(45) Date of Patent: Jan. 15, 2002

(54) WATERPROOF SHEET FIXING MEMBER AND METHOD OF FIXING THE SAME

(75) Inventors: Takashi Yamanaka; Masaya Sera, both of Osaka; Yasuo Kumamoto, Tokyo; Takatoshi Imafuku, Chiba, all of (JP)

(73) Assignee: Tsutsunaka Plastic Industry Co., Ltd., Osaka (JP)

( * ) Notice: Subject to any disclaimer, the term of this patent is extended or adjusted under 35 U.S.C. 154(b) by 0 days.

(21) Appl. No.: 09/454,994

(22) Filed: Dec. 6, 1999

(30) Foreign Application Priority Data

Dec. 8, 1998 (JP) .......................... 10-348053
Oct. 19, 1999 (JP) .......................... 11-296676

(51) Int. Cl.$^7$ ................................. E04B 1/00
(52) U.S. Cl. .................. 52/746.1; 52/410; 52/746.11; 428/137; 428/138; 442/19; 442/52
(58) Field of Search ............... 52/410, 746.1, 52/746.11; 428/137, 138; 442/19, 52

(56) References Cited

U.S. PATENT DOCUMENTS 3,996,402 A * 12/1976 Sindt ..................... 428/140
4,396,665 A * 8/1983 Rowe .................... 428/148
4,521,659 A * 6/1985 Buckley et al. ............. 219/633
5,094,056 A * 3/1992 Peters ..................... 52/410

FOREIGN PATENT DOCUMENTS

JP 04254649 A 9/1992
JP 04254649 * 9/1992 ............ E04D/5/14
JP 07158395 A 6/1995

* cited by examiner

Primary Examiner—Beth A. Stephan
Assistant Examiner—Dennis L. Dorsey
(74) Attorney, Agent, or Firm—Armstrong, Westerman, Hattori, McLeland & Naughton, LLP

(57) ABSTRACT

A waterproof sheet fixing member for fixing a waterproof thermoplastic resin sheet on a structure to be waterproofed, includes a plate-like main member made of thermoplastic resin, and a conductive multi-aperture sheet having an upper surface and a lower surface. The conductive multi-aperture sheet has a plurality of joining apertures each communicating the upper surface with the lower surface, and is integrally provided in the main member. A method of fixing the waterproof thermoplastic resin sheet includes the steps of fixing the fixing member on a surface of the structure, spreading the waterproof thermoplastic resin sheet on the surface of the structure, and induction heating the conductive multi-aperture sheet via the waterproof thermoplastic resin sheet to melt a portion where the main member contacts the waterproof thermoplastic resin sheet. Thus, the main member is integrally welded to the waterproof thermoplastic resin sheet.

40 Claims, 12 Drawing Sheets

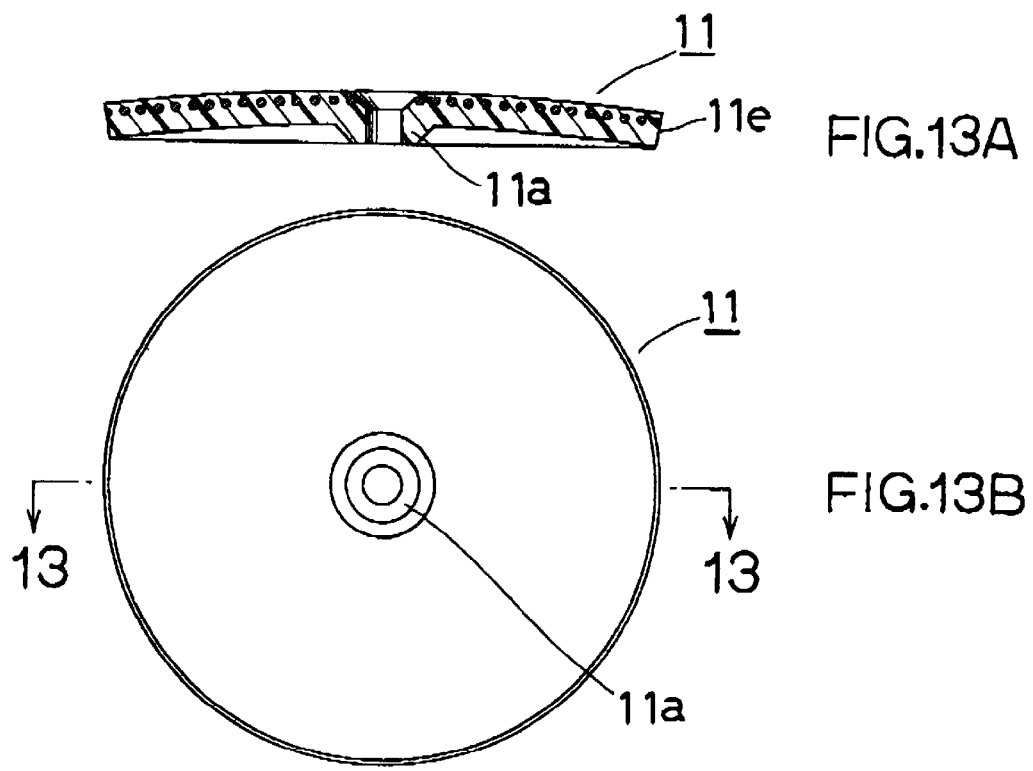
FIG.13A
FIG.13B
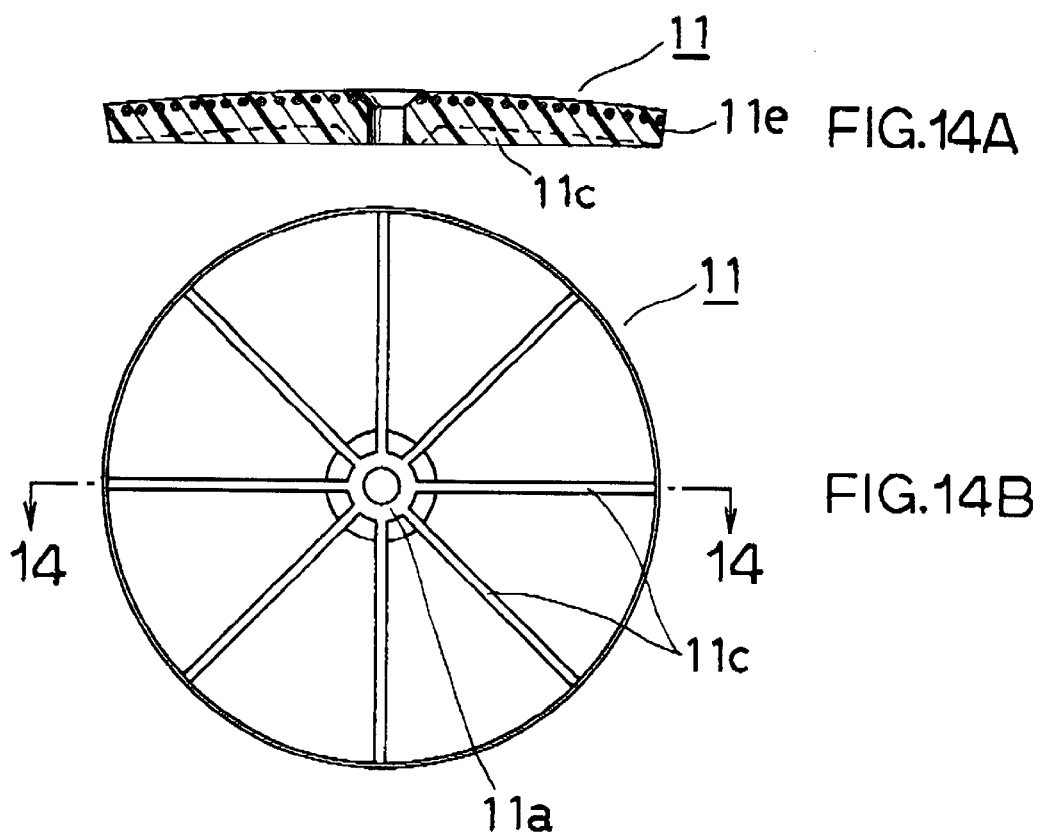
FIG.14A
FIG.14B

WATERPROOF SHEET FIXING MEMBER AND METHOD OF FIXING THE SAME

BACKGROUND OF THE INVENTION

1. Field of the Invention

This invention relates to a waterproof sheet fixing member for fixing a waterproof sheet to a structure to be waterproofed, and a method of fixing the waterproof sheet on the structure.

2. Description of Prior Art

Conventionally, in order to prevent rainwater from soaking into a structure such as a building or a house, a waterproof synthetic resin sheet is spread and fixed on the outer surface of the structure by an insulation method. The insulation method includes the steps of: fixing a plurality of waterproof sheet fixing discs made of a steel plate covered by a vinyl chloride film on the surface of the structure in a scattered manner by using anchors such as expandable nails or curl plugs; spreading a waterproof sheet made of synthetic resin or the like on the surface of the structure; and adhering the waterproof sheet to the fixing discs by using solvent ("solvent adhering method"), heat ("heat adhering method"), or glue ("glue adhering method").

However, the heat adhering method is not preferably from a viewpoint of safety because there is a possibility that a worker will get burned if the worker touches the heating source.

On the other hand, the solvent adhering method and glue adhering method are inferior in work ability and productivity because of the troublesome operations for coating the solvent or glue on the fixing discs. Furthermore, it is inevitable for the worker to breathe the chemical vapor of the solvent or glue during the coating operation. Thus, these methods are also not preferable from a viewpoint of safety.

Japanese Unexamined Laid-open Patent Publication No. H4(1992)-254649 (hereinafter referred to as "JP4-254649") proposes a waterproof sheet fixing method which used no solvent or glue. The fixing method includes the steps of: fixing a fixing disc on a structure surface, wherein the fixing disc is made of a conductive plate such as a steel plate on which a thermoplastic resin layer is laminated; spreading a waterproof sheet so as to cover the fixing disc; and impressing a high frequency electromagnetic field to the fixing disc via the waterproof sheet to heat and melt the thermoplastic resin layer by the induction heating (i.e., eddy-current heating) so that the waterproof sheet is adhered to the fixing disc.

Another proposal has been made by Japanese Unexamined Laid-open Patent Publication No. H7(1995)-158395 (hereinafter referred to as "JP7-158395"). According to this proposal which also utilizes induction heating, a sheet fixing member includes a main body made of resin capable of being welded by heat to a waterproof sheet and an induction heat adhesive layer laminated on the upper surface of the main body. The induction heat adhesive material is a sheet-like member comprising resin capable of being welded by heat to the waterproof sheet and metal fibers or magnetic powders dispersed and mixed in the resin, or a sheet-like member comprising a metal film and resin layers capable of being welded by heat to the waterproof sheet, provided on both sides of the metal film.

In the aforementioned methods, since the high frequency induction heating is employed, there are the following advantages. The fixing operation of the waterproof to the fixing disc can be effectively performed in a short time. A worker never gets burned since no heating source is employed. Furthermore, a preferable working environment can be obtained since no solvent or glue is used.

However, the aforementioned prior arts have the following drawbacks.

The method disclosed in JP4-254649 employs a fixing disc comprising a conductive plate and a thermoplastic resin layer laminated on the conductive plate, as mentioned above. The conductive plate is usually made of metal such as steel or the like, and is not made of thermoplastic resin. Thus, the fixing disc is formed by laminating different materials, i.e., the conductive plate and the thermoplastic resin layer. As a result, the joining strength therebetween is generally low. Especially, it is difficult to obtain sufficient durability of the joining strength. Accordingly, the conductive plate and the thermoplastic resin may gradually separate as time passes, resulting in a gradual loss of fixing state of the waterproof sheet. Furthermore, in a case where [an] insulation is required to the structure to be waterproofed, an insulation layer is directly disposed on the surface of the structure. Since the insulation layer is generally made of material which is easily affected by heat such a polyurethane foam or polystyrene foam, the insulation layer may melt to be deformed due to the heat generated in the conductive plate. Accordingly, it is difficult to obtain the predetermined insulation performance.

On the other hand, according to one of the methods disclosed in JP7-158395 which employs the sheet-like fixing member comprising resin and metal fibers or magnetic powders dispersed and mixed therein, it is required that a large amount of metal fibers or magnetic powders is dispersed and mixed in the resin main body in order to securely fix the waterproof sheet to the sheet fixing member by the induction heating. However, this causes a heavy deterioration of strength of the sheet-like fixing member, resulting in an insufficient joining of the waterproof sheet to the sheet-like fixing member. Especially, it is difficult to obtain sufficient durability of the joining strength, resulting in a gradual loss of fixing status of the waterproof sheet.

According to the other method disclosed in JP7-158395 which employs a sheet fixing member including a sheet-like member comprising a metal film and resin layers capable of being welded by heat to the waterproof sheet laminated on both sides of the metal film, since different materials are laminated, the joint strength between the metal film and the laminated resin layer is generally low. Especially, it is difficult to obtain sufficient durability of the joint strength. Accordingly, the metal film and the laminated resin layer will be gradually separated as time passes, resulting in a gradual loss of fixing status of the waterproof sheet.

SUMMARY OF THE INVENTION

The present invention is made in view of the aforementioned technical background. It is an object of the present invention to provide a waterproof sheet fixing member and a method of fixing the waterproof sheet on a structure to be waterproofed by which a sufficiently strong and long lasting joint fixing status between the fixing member and the waterproof sheet can be obtained when they are welded by induction heating.

It is still other object of the present invention to provide a waterproof sheet fixing member for fixing a waterproof sheet on a structure to be waterproofed by induction heating, which causes less thermal deformation of a thermoplastic resin at a peripheral edge of the fixing member, regardless of a positional relationship between the fixing member and an induction heating device.

According to a first aspect of the present invention, a waterproof sheet fixing member for fixing a waterproof thermoplastic resin sheet on a structure to be waterproofed includes a plate-like main member made of a thermoplastic resin; and a conductive multi-aperture sheet having an upper surface and a lower surface, the conductive multi-aperture sheet having a plurality of apertures each communicating the upper surface with the lower surface, wherein the conductive multi-aperture sheet is integrally provided in the main member.

When fixing the waterproof sheet to the sheet fixing member, an eddy-current is generated in the conductive multi-aperture sheet due to high-frequency electromagnetic induction to cause direct heating of the waterproof sheet. The thermoplastic resin near the conductive multi-aperture sheet melts due to heat caused by the heating of the conductive multi-aperture sheet to cause the welding of the fixing member and the waterproof sheet. Both the resin of the waterproof sheet and that of the conductive multi-aperture sheet are directly welded by way of plurality of apertures formed in the conductive multi-aperture sheet, resulting in sufficient joint strength between the main member and the conductive multi-aperture sheet. Furthermore, since the resin near the conductive multi-aperture sheet provided in the fixing member is to be melted by the heat generated in the conductive multi-aperture sheet, almost no heat reaches the outer surface of the waterproof sheet, resulting in a good appearance of the waterproof sheet spread and fixed on the structure.

According to a second aspect of the present invention, a waterproof sheet fixing member for fixing a waterproof thermoplastic resin sheet on a structure to be waterproofed includes a plate-like main member made of thermoplastic resin, and a conductive multi-aperture sheet having an upper surface and a lower surface, wherein the conductive multi-aperture sheet has a plurality of apertures each communicating the upper surface with the lower surface. The conductive multi-aperture sheet is integrally provided in the main member. The fixing member further includes an anchor insertion hole provided at a central portion of the main member, a spacer provided on a lower surface of the main member so as to surround the anchor insertion hole, and a reinforcing protruded edge downwardly protruded from a peripheral edge of the main member.

With this waterproof sheet fixing member, by impressing a high frequency electromagnetic field with an oscillation surface of an induction heating device disposed on the fixing member via the waterproof sheet, a generation of heat occurs in the conductive multi-aperture sheet to heat and melt the main member made of thermoplastic resin near the sheet. The lower surface of the fixing member is hardly heated, and the reinforcing protruded edge is also hardly heated to effectively support the main member which is to be melted.

The spacer prevents a deformation of the fixing member even if an anchor nail is excessively inserted into the structure to which the waterproof sheet is to be fixed. This spacer and reinforcing protruded edge also prevent a deformation of the fixing member due to the pressing force of the high frequency induction heating device at the time of welding the waterproof sheet to the fixing member. This causes a flat surface of the fixing member. Since the conductive multi-aperture sheet is provided with a plurality of joining apertures, the sheet is strongly and integrally laminated to the main member, resulting in enhanced rigidity of the fixing member.

According to a third aspect of the present invention, a waterproof sheet fixing member for fixing a waterproof thermoplastic resin sheet on a structure to be waterproofed includes a plate-like main member made of thermoplastic resin, and a conductive multi-aperture sheet having an upper surface and a lower surface. The conductive multi-aperture sheet has a plurality of apertures each communicating the upper surface with the lower surface, wherein the conductive multi-aperture sheet is integrally provided in the main members. The fixing member further includes an anchor insertion hole provided at a central portion of the main member, and the main member is formed to have a curved upper surface.

With this waterproof sheet fixing member, by impressing a high frequency electromagnetic field with an oscillation surface of a high frequency heating device disposed on the fixing member via the waterproof sheet, a generation of heat occurs in the conductive multi-apertures sheet to heat and melt the main member made of thermoplastic resin near the sheet. At this time, the fixing member contacts the oscillation surface via the waterproof sheet in a state that a spherical surface (i.e., an upper surface of the fixing member) faces a flat surface (i.e., an oscillation surface). Therefore, the distance between the conductive multi-aperture sheet and the oscillation surface gradually increases toward outside from the contact point. In accordance with the increase of the distance, the generation of heat in the conductive multi-aperture sheet decreases. Thus, an excessive melting of the peripheral edge of the main member will not occur. Even if the oscillation surface contacts the fixing member in an inclined state, the relationship between the spherical surface and the oscillation surface contacted by the spherical surface maintains in the same manner as mentioned above. Since the conductive multi-aperture sheet applied to the fixing member is securely laminated to the main member and the fixing member has an upper spherical surface, the rigidity of the fixing member is enhanced.

According to a fourth aspect of the present invention, a method of fixing a waterproof thermoplastic resin sheet on a structure to be waterproofed, the method includes the steps of:

preparing a plate-like main member integrally provided with a conductive multi-aperture sheet, wherein the conductive multi-aperture sheet has a plurality of apertures each communicating an upper surface of the main member with a lower surface of the main member;

fixing the main member on a surface of the structure;

disposing the waterproof thermoplastic resin sheet on the surface of the structure; and induction heating the conductive multi-aperture sheet via the waterproof thermoplastic resin sheet to melt a portion where the main member contacts the waterproof thermoplastic resin sheet so that the main member is integrally welded to the waterproof thermoplastic resin sheet.

According to the aforementioned method, the conductive multi-aperture sheet can be directly heated due to the high frequency electromagnetic induction action to melt the thermoplastic resin near the conductive multi-aperture sheet by the induction heating, whereby the main member and the waterproof sheet can be welded. Since the resin of the main member and that of the waterproof sheet are directly welded by way of the plurality of joining apertures provided in the conductive multi-aperture sheet, sufficient joining strength between the main member and the waterproof sheet can be obtained.

BRIEF DESCRIPTION OF THE DRAWINGS

Other objects and advantages of the present invention will become apparent from the detailed description of the preferred embodiments with reference to the attached drawings, wherein:

FIG. 13 illustrates another embodiment of the present invention, wherein FIG. 13A is a cross-sectional view taken along the line 13—13 of FIG. 13B, and FIG. 13B is a bottom view thereof;

FIG. 14 illustrates still another embodiment of the present invention, wherein FIG. 14A is a cross-sectional view taken along the line 14—14 of FIG. 14B, and FIG. 14B is a bottom view thereof;

DETAILED DESCRIPTION OF THE PREFERRED EMBODIMENTS

A waterproof sheet fixing member according to the present invention will be explained with reference to the attached drawings.

Figure 1:
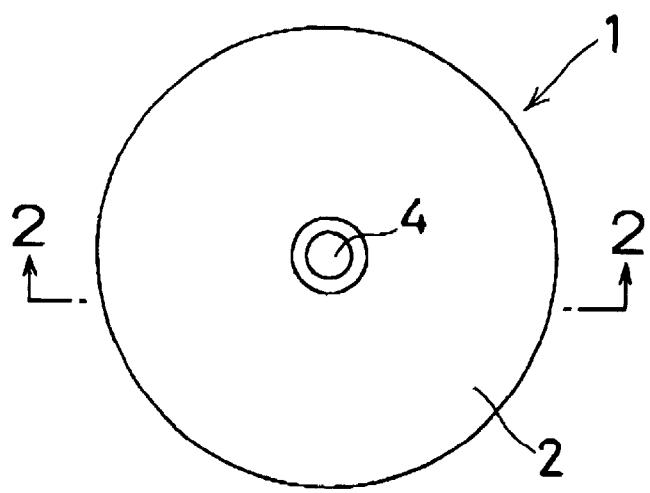
FIG. 1 is a top view of a waterproof fixing member according to an embodiment of the present invention.
Figure 2:
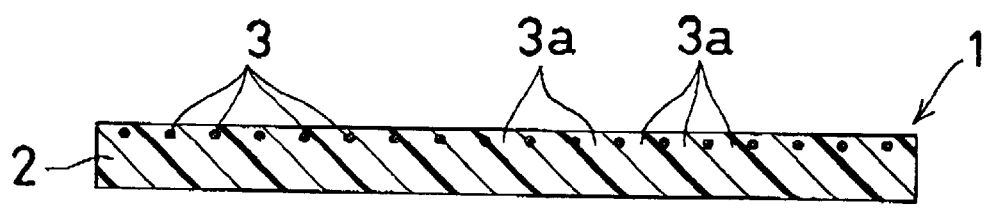
FIG. 2 is an enlarged cross-sectional view taken along the lines 2—2 in FIG. 1.

FIG. 1 illustrates a top view of a waterproof sheet fixing member 1 according to the present invention, and FIG. 2 illustrates an enlarged cross-sectional view taken along the line 2—2 in FIG. 1.

The fixing member 1 includes a circular plate-like main member 2 having an anchor insertion hole 4 and a conductive multi-aperture sheet 3. The conductive multi-aperture sheet 3 is integrally embedded in the main member 2 such that the sheet 3 is located at a portion near the upper surface of the main member 2 on which a waterproof sheet 15 is to be welded. The aforementioned anchor insertion hole 4 is used for inserting an anchor, such as an expandable nail or a curl plug, so as to fix the fixing member 1 to a structure A.

In this invention, the main member 2 is made of thermoplastic resin. Although the type of thermoplastic resin is not limited to a specific one, it is preferable to employ the same type of resin as that of waterproof sheet 15. This results in an enhanced mixture of resins when welding them as well as an enhanced joint strength between the fixing member 1 and the waterproof sheet 15. It is more preferable to use the same resin. Although the thermoplastic resin constituting the main member 2 is not specifically limited, it is preferable to use polyolefin resin including polyethylene resin and polypropylene resin, or vinyl chloride resin. It is more preferable to use polyolefin resin including polyethylene resin and polypropylene resin because the polyolefin resin is excellent in recycle ability and heat stability.

Figure 8:
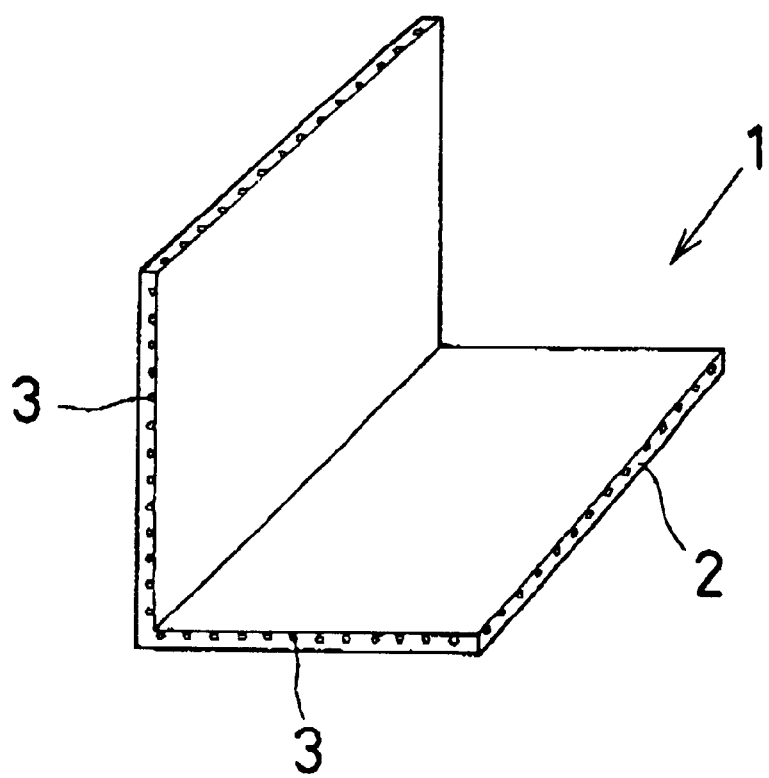
FIG. 8 is a perspective view of a waterproof fixing sheet according to another embodiment of the present invention.

The main member 2 is generally formed into a plate-shape such as a disc-shaped. However, the main member 2 is not limited to the plate-shape. The main member 2 may be integrally provided with an anchor such as an expandable nail or curl plug or fixing the main member 2 to the structure A, or may be formed into, for example, an L-shape as shown in FIG. 8 so as to be fitted to an L-shaped corner of the structure A.

The conductive multi-aperture sheet 3 is not limited to a specific one as log as it is provided with a plurality of joining apertures 3a each communicating the upper surface of the sheet 3 with the lower surface thereof. Since the sheet 3 is a conductor, the conductive multi-aperture sheet 3 generates eddy-currents by electromagnetic induction action, thereby enabling a direct heating of the sheet 3. The heat generated in the conductive multi-aperture sheet 3 due to the electromagnetic induction action, enables a melting of the thermoplastic resin near the sheet 3, whereby the fixing member 1 is welded to the waterproof sheet 15 by the melted resins of the contact portions thereof. Since the conductive multi-aperture sheet 3 is provided with a plurality of joining apertures 3a, the resin layer located above the sheet 3 and the resin layer located below the sheet 3 and directly welded via the joining apertures 3a. In other words, the joint portions are disposed in a scattered manner between the main member 2 and the waterproof sheet 15. Therefore, the conductive multi-aperture sheet 3 and the resin layer 2b above the sheet 3 will not be separated at the boundary region, resulting in sufficient joint strength between the fixing member 1 and the waterproof sheet 15 as well as a long-term stable joining status. In detail, since the conductive multi-aperture sheet 3 has a plurality of joining apertures 3a each communicating the upper surface with the lower surface of the sheet 3, sufficient joint strength between the fixing member 1 and the waterproof sheet 15 can be obtained regardless of the structure of the fixing member 1 in which different types of materials (i.e., a conductive material such as a metal and thermoplastic resin) are laminated.

The material of the conductive multi-aperture sheet 3 is not limited to a specific one as long as eddy-currents are generated by the electromagnetic induction action when the sheet 3 is disposed in alternating electromagnetic fields. It is preferable to use a conductive metal, such as stainless steel, copper, aluminum, iron, nickel, brass, gold or silver, because the conductive metal can shorten the joining time due to the excellent heat generation efficiency in the induction heating. It is more preferable to use stainless steel, copper, aluminum and iron from the viewpoint of heat conductivity and cost performance.

Figure 3:
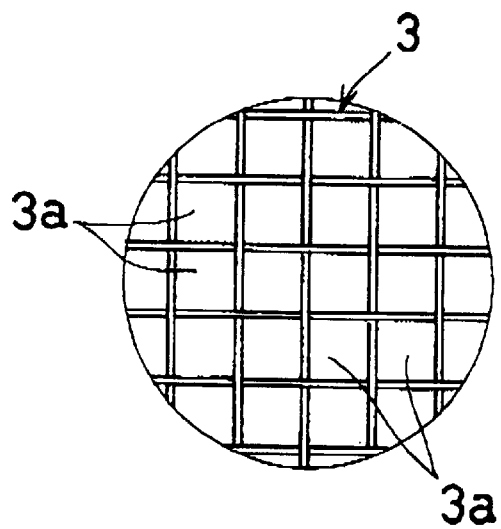
FIG. 3 is an enlarged view of a conductive multi-aperture sheet consisting a part of the fixing member shown in FIG. 1.
Figure 5:
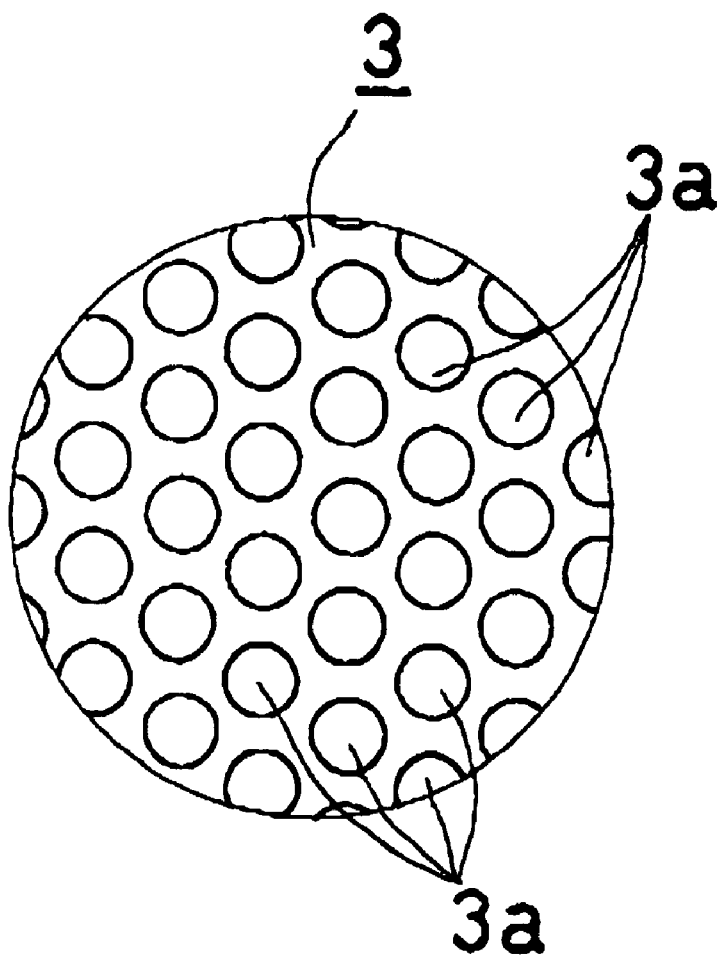
FIG. 5 is an enlarged plan view showing still another embodiment of a conductive multi-aperture sheet.
Figure 6:
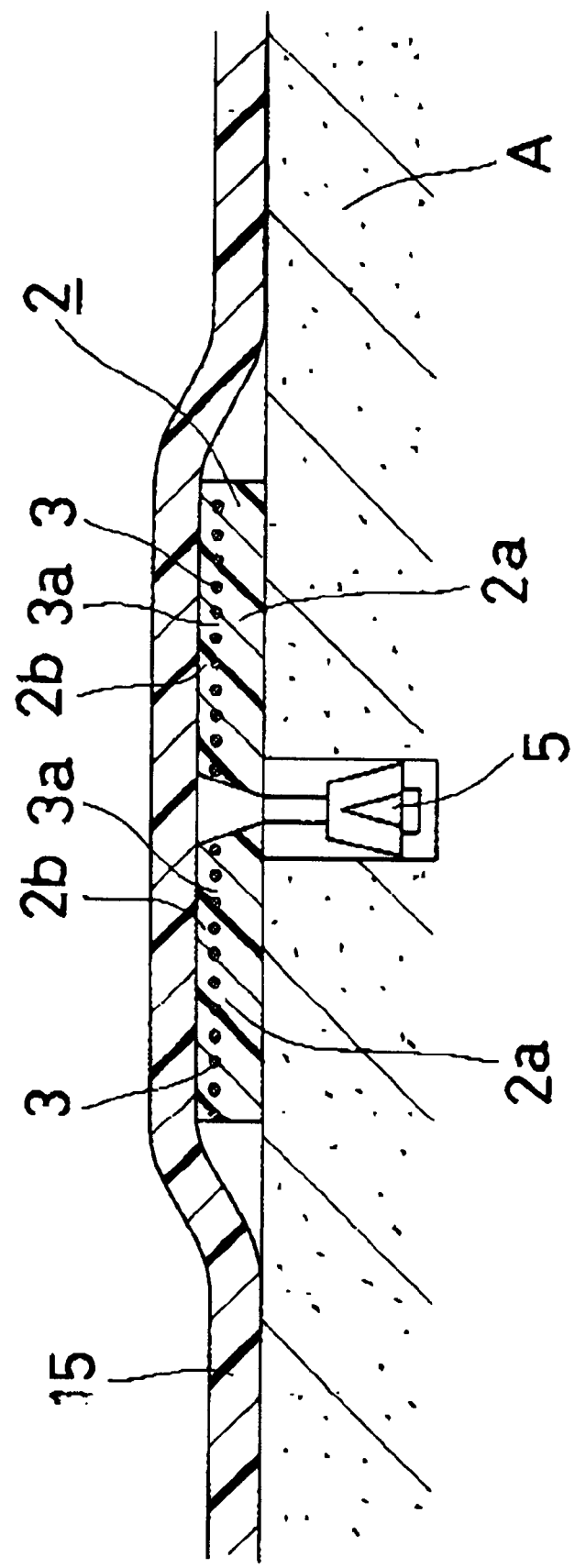
FIG. 6 is a cross-sectional view showing that the waterproof sheet if fixed on the structure.
Figure 7:
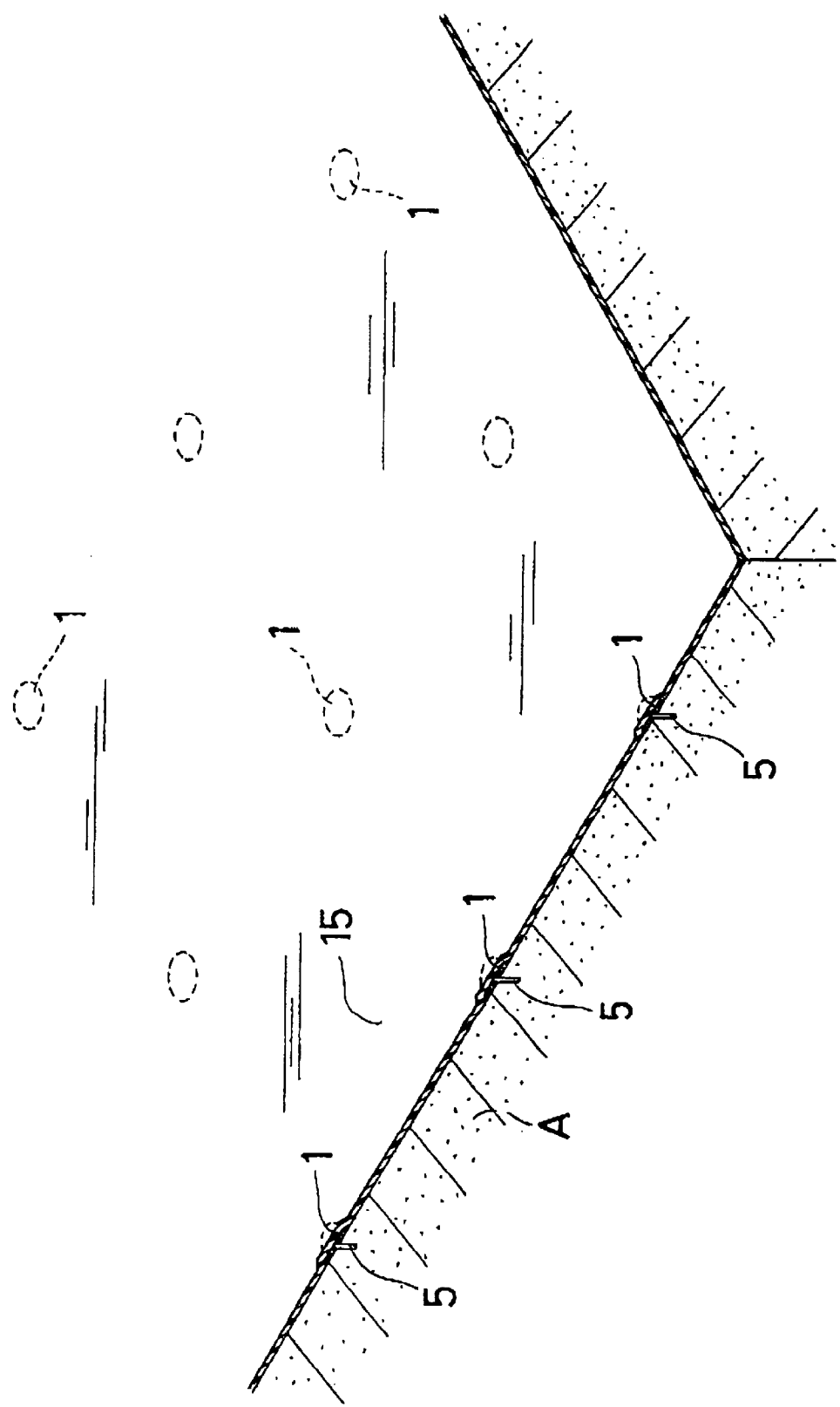
FIG. 7 is a perspective view showing that the waterproof sheet is fixed on the structure.

As the aforementioned conductive multi-aperture sheet 3, a mesh-like member as shown in FIG. 3 or a punched sheet as shown in FIG. 5 are preferably used. The mesh-like member and the punched sheet can maintain a certain quality required as a fixing member 1 because a desired sheet can be manufactured reproducibly, and can reduce the manufacturing cost because of its high productivity.

It is preferable that the opening ratio of the conductive multi-aperture sheet 3 falls within the range of from 20 to 80% because of the following reasons. If the ratio is smaller than 20%, it is difficult to obtain sufficient joint strength between the waterproof sheet 15 and the fixing member 1 due to the decreased joining area via the joining aperture 3a. In other words, the upper resin layer 2b is easily separated from the conductive multi-aperture sheet 3 at the boundary region thereof. On the other hand, if the ratio exceeds 80%, it is difficult to maintain sufficient joint strength because the resins near the conductive multi-aperture sheet 3 do not sufficiently melt by the induction heating. It is more preferable that the ratio falls within the range of from 40 to 60%. The opening ratio is defined as a ratio of the total area of the joining apertures 3a to the total area of the conductive multi-aperture sheet 3. Therefore, for example, if the total area of the joining apertures 3a per 25 cm$^2$ of the sheet 3 is 2.5 cm$^2$, the opening ratio is 10%.

It is preferable that an area of each joining aperture 3a falls within the range of from 0.25 to 100 mm$^2$ because of the following reasons. If the area is less than 0.25 mm$^2$, the joining area each joining aperture 3a is too small to obtain sufficient joining strength. On the other hand, if the area exceeds 100 mm$^2$, the heat generated by the induction heating will not reach the central portion of each joining aperture 3a, resulting in insufficient joining strength. It is more preferable that the area falls within the range of from 0.4 to 30 mm$^2$. The optimum area is from 2 to 10 mm$^2$.

In a case where the aforementioned mesh-like member (mesh sheet) is employed as the conductive multi-aperture sheet 3, it is preferable that the thickness of each wire constituting the mesh falls within the range of from 0.1 to 3 mm because of the following reasons. If the thickness is less than 0.1 mm, it is difficult to generate enough heat to melt the resins by the induction heating, resulting in insufficient joining strength. On the other hand, if the thickness exceeds 3 mm, the unevenness of the upper surface of the waterproof sheet after being fixed on the structure becomes larger because of the increased thickness of the fixing member 1, and the material cost increases. It is more preferable that the thickness falls within the range of from 0.5 to 1.5 mm.

In a case where the aforementioned punched sheet is employed as the conductive multi-aperture sheet 3, it is preferable that the thickness of the sheet falls within the range of from 0.01 to 1.0 mm because of the following reasons. If the thickness is less than 0.01 mm, it is difficult to generate enough heat to melt the resins by the induction heating, resulting in insufficient joining strength. On the other hand, if the thickness exceeds 1.0 mm, an excessive amount of heat will be generated by the induction heating to melt the excessive amount resins.

It is preferable that the conductive multi-aperture sheet 3 is integrally provided in the main member 2 so as to be located between the upper surface of the main member 2 and the middle of thickness of the main member 2. It is more preferable that the conductive multi-aperture sheet 3 is positioned at a portion near the upper surface of the main member 2 (including the upper surface to which the waterproof sheet 15 is to be fixed). The above-mentioned positioning of the conductive multi-aperture sheet 3 enables a melting of the selected portion required to be melted when welding the fixing member 1 and the waterproof sheet 15 by heat generated in the conductive multi-aperture sheet 3 by the induction heating. Therefore, even in a case where an insulation layer made of less heat resistance materials such as polyurethane foam is disposed between the fixing member 1 and the structure A on which the waterproof sheet 15 is to be fixed, since the positioning of the conductive multi-aperture sheet 3 enables a melting of the selected portion required to be melt, it is possible to minimize the affection of the heat generated in the conductive multi-aperture sheet 3 to the insulation layer. As a result, the insulation layer will not be deformed by the induction heating, which maintains the predetermined insulation performance. Of course, in the present invention, the conductive multi-aperture sheet 3 may be positioned near the lower surface of the main member 2. However, in a case where an insulation layer is disposed as mentioned above, the above-mentioned positioning of the conductive multi-aperture sheet 3 is not recommended because the heat generated by the conductive multi-aperture sheet 3 may cause a melting of the insulation layer as well as it takes longer time to complete the welding of the fixing member 1 and the waterproof sheet 15.

Figure 4A:
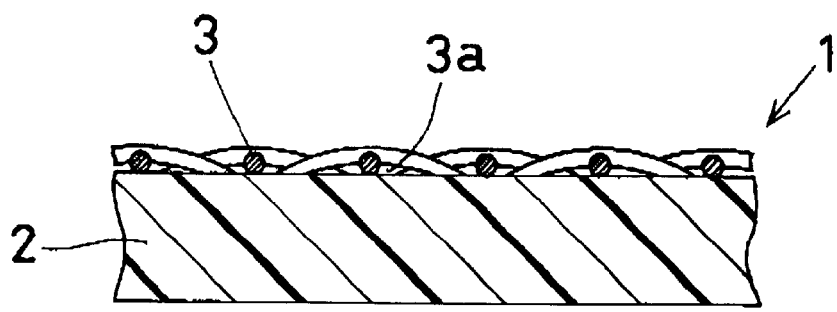
FIGS. 4A to 4C are cross-sectional views of other embodiments.
Figure 4B:
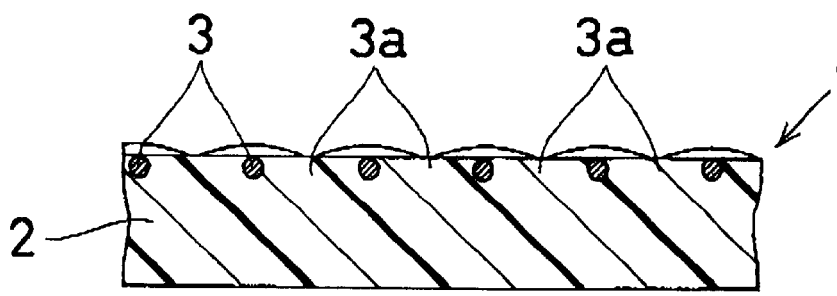
Figure 4C:
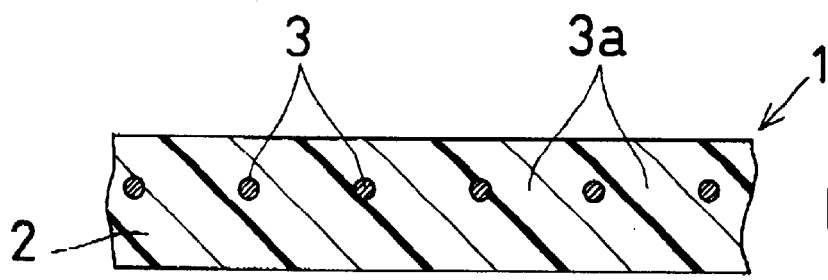

In the above-mentioned embodiment, the conductive multi-aperture sheet 3 embedded in the main body 2 is positioned near the upper surface as shown in FIG. 2. However, the present invention is not limited to the above, and allows various modifications. For example, the sheet 3 may be secured on the surface of the main member 2 such that almost all of the sheet 3 is exposed with the lower portion of the sheet 3 embedded to the main member 2 as shown in FIG. 4A; the sheet 3 may be integrally embedded in the main member 2 with the upper portion of the sheet 3 slightly exposed as shown in FIG. 4B; and the sheet 3 may be completely embedded in the main member 2 such that the sheet 3 is positioned slightly above the middle of thickness of the main member 2 as shown in FIG. 4C.

It is preferable that the conductive multi-aperture sheet 3 is positioned on the surface of the main member 2 or within a surface depth (i.e., thickness) of 1 mm. The above-mentioned positioning of the conductive multi-aperture sheet 3 enables [a] melting of the selected portion which is required to be melted, when welding the fixing member 1 and the waterproof sheet 15, by heat generated in the conductive multi-aperture sheet 3 by induction heating.

For example, the fixing member 1 can be manufactured by disposing a conductive multi-aperture sheet on a thermoplastic resin sheet (corresponding to the main member), alternatively, by disposing a conductive multi-aperture sheet between two thermoplastic resin sheets, and heat pressing these laminated sheets to be integrally welded.

The fixing of the waterproof sheet 15 on the structure A by using the fixing members 1 will be performed, for example, as follows.

First, the aforementioned plurality of fixing member 1 are fixed on the surface of the structure A, such as a building to be waterproofed, by anchors 5 in a scattered manner. In detail, the fixing member 1 is positioned on the structure A with the joining surface facing up. Then, an anchor 5, mechanical fixing means including an expandable nail or a curl plug, is inserted in the anchor insertion hole 4 and fixed to the structure A.

Thereafter, the waterproof sheet 15 is spread on the structure A. In this state, the oscillation surface of the high frequency induction heating device is disposed on a portion of the waterproof sheet 15 right above the fixing member 1, preferably while pressing, and then a high frequency electromagnetic field is impressed. The impression of high frequency electromagnetic field may be performed by moving the oscillation surface.

The high frequency electromagnetic induction action causes eddy-currents in the conductive multi-aperture sheet 3, resulting in a direct heating (induction heating) of the sheet 3. The induction heating of the conductive multi-aperture sheet 3 causes a melting of thermoplastic resin around the sheet 3, which in turn causes a melting of a contact portion between the fixing member 1 and the waterproof sheet 15. Thus, the waterproof sheet 15 is welded to the fixing member 1.

Since the conductive multi-aperture sheet 3 is provided with a plurality of joining apertures 3a, the resin 2a below the sheet 3 and the resin 2b above the sheet 3 are directly welded by way of the joining apertures 3a. These welded portions are formed in a scattered manner, which effectively prevents a separation of the resin layer 2b above the sheet 3 and the resin layer 2a below the sheet 3 at their boundary. Therefore, sufficient and stable joining strength can be obtained between the fixing member 1 and the waterproof sheet 15. The language "high frequency" in this specification is defined as a frequency higher than the frequency of commercial electrical power (50 Hz). The preferable range is from 300 kHz to 1 MHz.

Although the thermoplastic resin constituting the waterproof sheet 15 is not specifically limited, it is preferable to use soft vinyl chloride resin, polyethylene resin, or polypropylene resin. It is more preferable to use polyolefin resin including polyethylene resin and polypropylene resin because the polyolefin resin is excellent in recycle ability and heat stability. It is a common practice to use a waterproof sheet 15 having a thickness of 1.0 to 2.0 mm.

Figure 9:
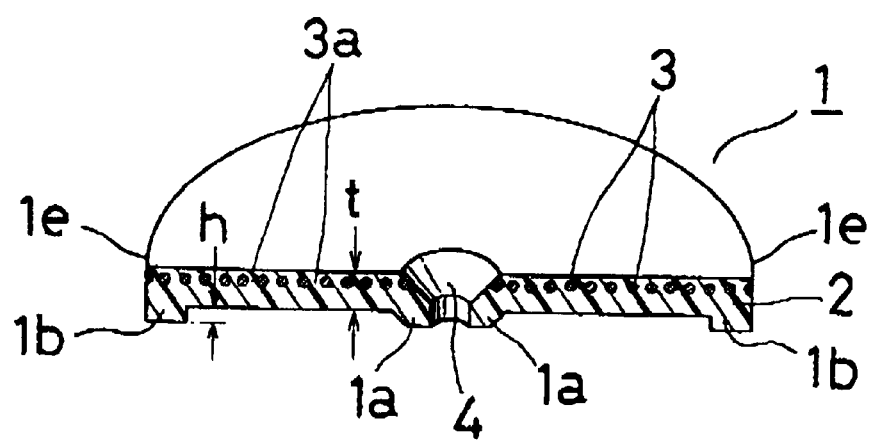
FIG. 9 is a perspective view showing a cross-section of a waterproof fixing sheet according to still another embodiment of the present invention.

FIG. 9 illustrates a cross-sectional perspective view according to another embodiment of the present invention. This waterproof sheet fixing member 1 is similar to the fixing member shown in FIG. 1, but different in that a spacer 1a is provided on the lower surface of the main member 2 so as to surround the anchor insertion hole 4, and in that a reinforcing protruded edge 1b is downwardly protruded from a peripheral edge of the main member 2. Since the other structure is the same as that of the fixing member shown in FIG. 1, the same reference numerals are allotted to the corresponding portions, and the explanation will be omitted.

Figure 10:
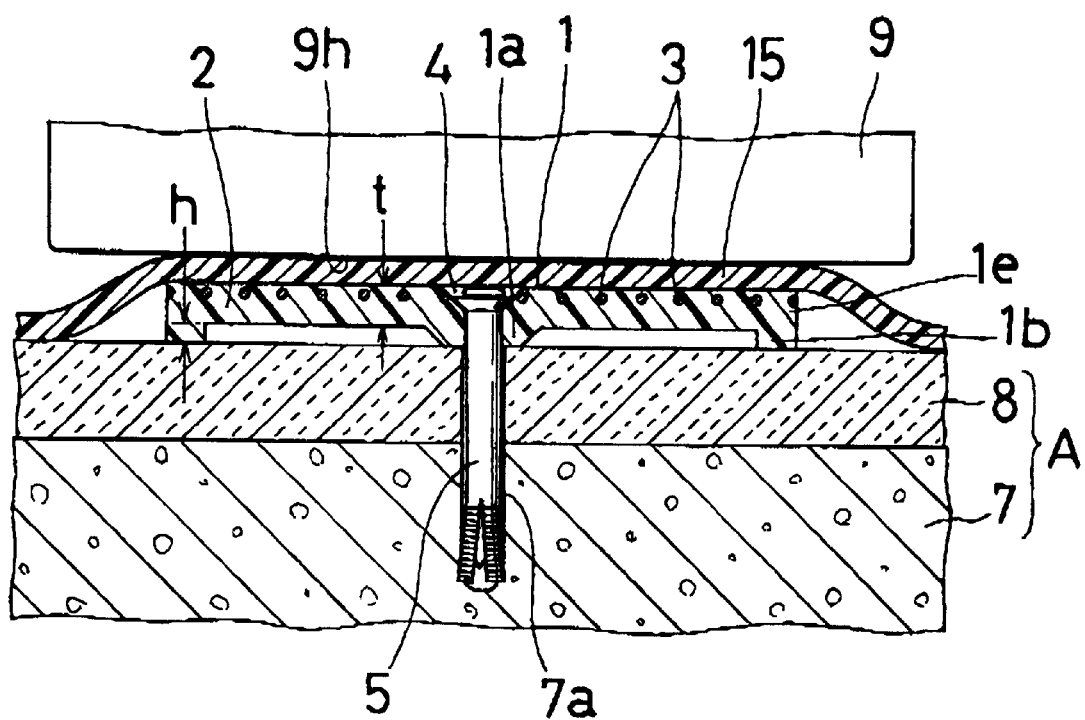
FIG. 10 is a cross-sectional view showing a welded state of the fixing member shown in FIG. 9 and the waterproof sheet.

FIG. 10 illustrates a welding state of the waterproof sheet 15 onto the fixing member 1. The fixing member 1 is secured on a structural body 7 by way of an insulation layer 8 by an anchor 5. The structural body 7 and the insulation layer 8 constitute a structure A. The anchor 5 is inserted into the anchor insertion hole 4 and secured in a bore 7a formed in the structural body 7. The lower surface of the spacer 1a is flush with the lower surface of the reinforcing protruded edge 1b. These lower surfaces are in touch with the insulation layer 8, but the rest of lower surface of the main member 2 is not in touch wit the insulation layer 8. The waterproof sheet 15 is disposed on the upper surface of the fixing member 1. The high frequency induction heating device 9 is placed on the waterproof sheet 15 above the fixing member 1, and then, a high frequency electromagnetic field is impressed thereto to weld the waterproof sheet 15 to the fixing member 1.

Figure 16:
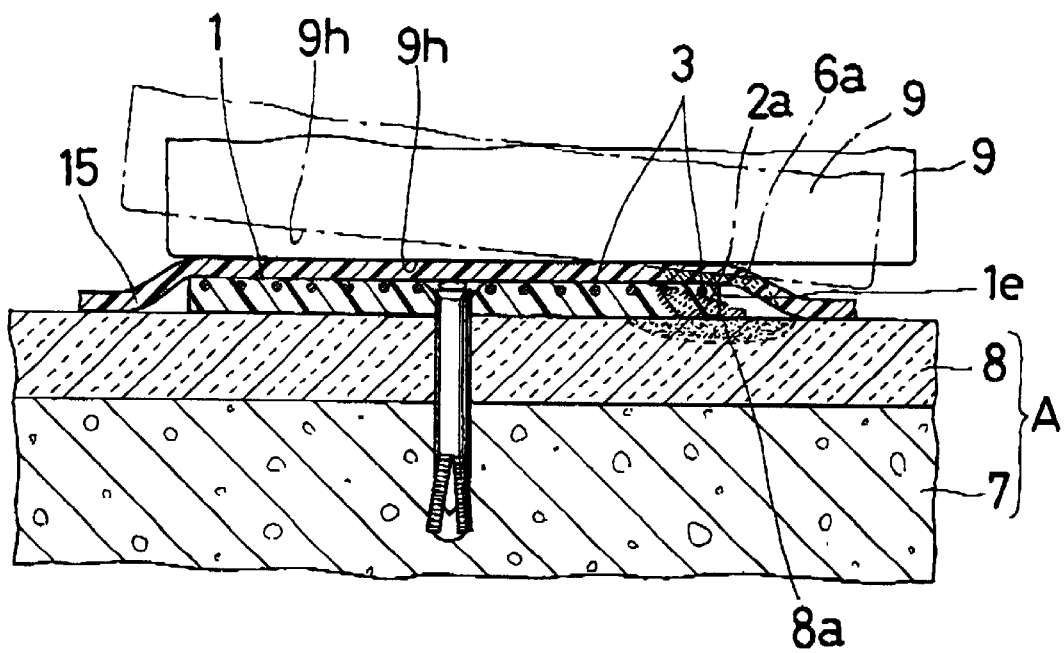
FIG. 16 illustrates the relationship between a high frequency induction heating device and the fixing member.

In the meantime, in the embodiment shown in FIG. 1, the waterproof sheet 15 and/or the insulation layer 8 would not be deformed by heat, provided that the center of the oscillation surface of the high frequency induction heating device 9 generally coincides with that of the fixing member 1, and that the oscillation surface is generally parallel with that of the fixing member 1. However, as shown in FIG. 16, if the center of the oscillation surface of the high frequency induction heating device 9 is displaced from that of the fixing member 1 (see the actual line in FIG. 16), or if the oscillation surface 9h of the high frequency induction heating device 9 is disposed on the fixing member 1 in an inclined state, a heat deformation 2a of the displaced or inclined side edge 1e of the fixing member 1 is enhanced. Therefore, the oscillation surface 9h approaches the conductive multi-aperture sheet 3, resulting in a further heating of the heat deformed portion 2a. This causes a transmission of high temperature to the lower surface of the fixing member 1. As a result, the waterproof sheet 15 and/or the insulation layer 8 may be deformed or damaged.

On the contrary, in the fixing member 1 shown in FIG. 9, the reinforcing protruded edge 1b will not melt to keep the hardness as it is. Therefore, the reinforcing protruded edge 1b can support the softened or melt thermoplastic resin near the conductive multi-aperture sheet 3, thereby preventing the deformation of the main body 2. Furthermore, the insulation layer 8 will not be melted to cause an insulation breakage because the lower surface of the fixing member 1 is not so much heated since the lower surface is relatively away from the conductive multi-aperture sheet 3 and that the lower surface of the fixing member 1, except for the lower surfaces the spacer 1a and reinforcing protruded edge 1b, is not in contact with the insulation layer 8.

The thickness (t) of the fixing member 1 usually falls within the falls of from about 2.5 to about 4.0 mm. The height (h) of the spacer 1a and reinforcing protruded edge 1b usually falls within the range of from about 2.0 to about 3.0 mm.

It is preferable that the thickness (t) falls within the range of from about 3.0 to about 3.8 mm because of the following reasons. If the thickness (t) exceeds the upper value, an unevenness of the waterproof sheet 15 will increase to deteriorate the appearance. If the thickness (t) is less than the lower value, the hardness cannot be maintained to decrease the joining force of the waterproof sheet 15.

It is preferable that the height (h) falls within the range of from about 2.5 to about 2.9 mm because of the following reasons. If the height (h) exceeds the upper value, an unevenness of the waterproof sheet 15 will increase to deteriorate the appearance. If the height (h) is less than the lower value, the heat deformation function of the peripheral edge 1e will deteriorate. The fixing member 1 is usually a circular shaped plate, and the diameter of the circular-shaped plate is usually from about 60 to about 70 mm.

Figure 11:
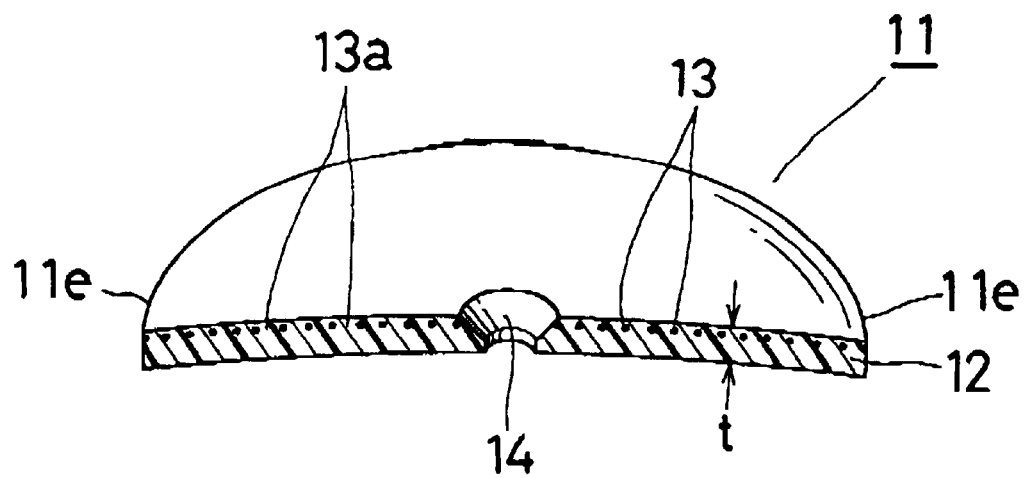
FIG. 11 is a perspective view showing a cross-section of a waterproof fixing sheet according to yet another embodiment of the present invention.

FIG. 11 illustrates a waterproof sheet fixing member 11 according to another embodiment. This fixing member 11 includes a main member 12 made of thermoplastic resin and a conductive multi-aperture sheet 13 having a plurality of joining apertures 13a each penetrating the sheet 13 in the thickness direction. The conductive multi-aperture sheet 13 is embedded in the main member 12 so as to be positioned from the surface of the main member 12 to the half depth (thickness) portion thereof. The fixing member 11 is formed to have a gentle spherical upper surface. The fixing member 11 is not provided with a reinforcing protruded edge at its peripheral edge, however, the other structure is generally the same as the structure of the fixing member shown in FIG. 1. Therefore, the variations of the positioning of the conductive multi-aperture sheet 13 shown in FIGS. 4A to 4C can also be applied to this embodiment.

Figure 12:
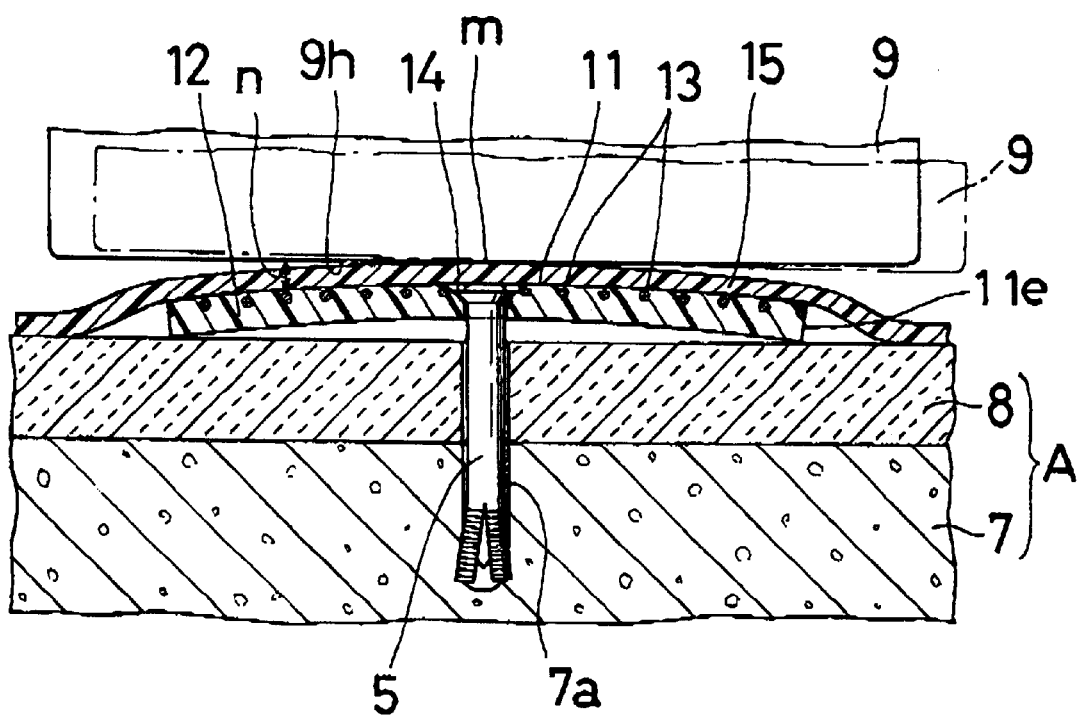
FIG. 12 is a vertical cross-sectional view showing a welded state of the fixing member shown in FIG. 11 and the waterproof sheet.

FIG. 12 illustrates a welding state of the waterproof sheet 15 onto the fixing member 15. The fixing member 11 is secured to a structural body 7 by way of an insulation layer 8 by an anchor 5. The structural body 7 and the insulation layer 8 constitute a structure A. The anchor 5 is inserted into the anchor insertion hole 14 and secured in a bore 7a formed in the structural body 7. According to the fixing member 11, even an excessive insertion of the anchor 5 will not cause a deformation of the fixing member 11 because of its stiffness.

The fixing member 11 is disposed on the insulation layer 8 in a state that only the lower portion of the peripheral edge 11e contacts the insulation layer 8. The oscillation surface 9h of the high frequency induction heating device 9 is placed on the fixing member 11 via the waterproof sheet 15. Thus, the waterproof sheet 15 is welded to the fixing member 11 by oscillating a high frequency electromagnetic field.

At this time, the flat oscillation surface 9h of the induction heating device 9 is placed above the fixing member 11 so as to be parallel to the fixing member 11. However, the oscillation surface 9h contacts the fixing member 11 via the waterproof sheet 15 in a state that a spherical surface (i.e., an upper surface of the fixing member) faces a flat surface (i.e., an oscillation surface). Therefore, the distance (n) between the conductive multi-aperture sheet 13 and the oscillation surface 9h gradually increases toward the peripheral edge 11e from the contact point (m). In accordance with the increase of the distance (n), the generation of heat in the conductive multi-aperture sheet 13 decreases. Thus, an excessive melting of the peripheral edge 11e of the main member 12 will not occur. Therefore, the conductive multi-aperture sheet 13 will not cause a partial abnormal deformation of the waterproof sheet 15, and the peripheral edge 11e of the fixing member 11 will not cause a melting of the insulation layer 8. Furthermore, even if the oscillation surface 9h contacts the fixing member 11 in a shifted and inclined state as shown in the dot-dash line in FIG. 12, the above-mentioned functions and results can be obtained.

If the radius of curvature of the spherical surface of the fixing member 11 is too small, the area for welding the waterproof sheet 15 cannot be obtained enough. On the contrary, if the radius is too large, a generation of heat at the peripheral edge 11e cannot be restrained. The radius should be determined taking into consideration the size, shape, etc. For example, if the fixing member 11 is a round shaped-plate having a diameter of 65 mm, it is preferable that the radius falls within the range of from about 200 to about 300 mm. An upper value of the radius within the range results in a good appearance of the waterproof sheet 15 without causing an unevenness of the surface thereof.

FIGS. 13A and 13B illustrate a modified embodiment of the fixing member shown in FIG. 11, wherein FIG. 13A is a cross-sectional view taken along the line 13—13 in FIG. 13B, and FIG. 13B is a bottom view thereof. The fixing member 11 has a spacer 11a at the lower central bottom portion thereof. The lower surface of the spacer 11a coincides with the lower surface of the peripheral edge 11e. This configuration surely prevents a deformation of the fixing member 11 when the fixing member 11 is fixed to the structural body 8 by an anchor 5. The spacer 11a also prevents a deformation of the fixing member 11 due to the pressure of the induction heating device 9.

FIGS. 14A and 14B illustrate another modified embodiment of the fixing member shown in FIG. 11, wherein FIG. 14A is a cross-sectional view taken along the line 14—14 in FIG. 14B, and FIG. 14B is a bottom view thereof. The fixing member 11 is provided with a plurality of reinforcing ledges 11c on the lower surface of the fixing member 11. The reinforcing ledges 11c radially extend from a central portion of the fixing member 11. The lower surfaces of the reinforcing ledges 11c coincide with the lower surface of the peripheral edge 11e. This prevents the fixing member 11 from being deformed into a flat shape when the fixing member 11 is fixed to the structural body 7. The reinforcing ledges 11c also prevent a deformation of the fixing member 11 due to the pressure of the induction heating device 9.

Both the aforementioned spacer 11a and reinforcing ledges 11c may be provided as shown in FIGS. 14A and 14B, which surely prevents a deformation of the fixing member 11 due to the pressure of the induction heating device 9.

Figure 15A:
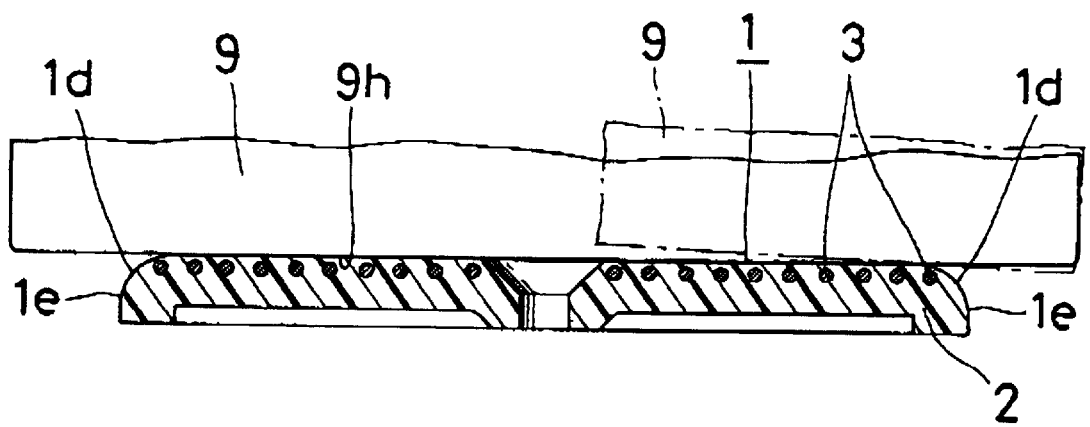
FIG. 15A illustrates a modification of the fixing member shown in FIG. 9.
Figure 15B:
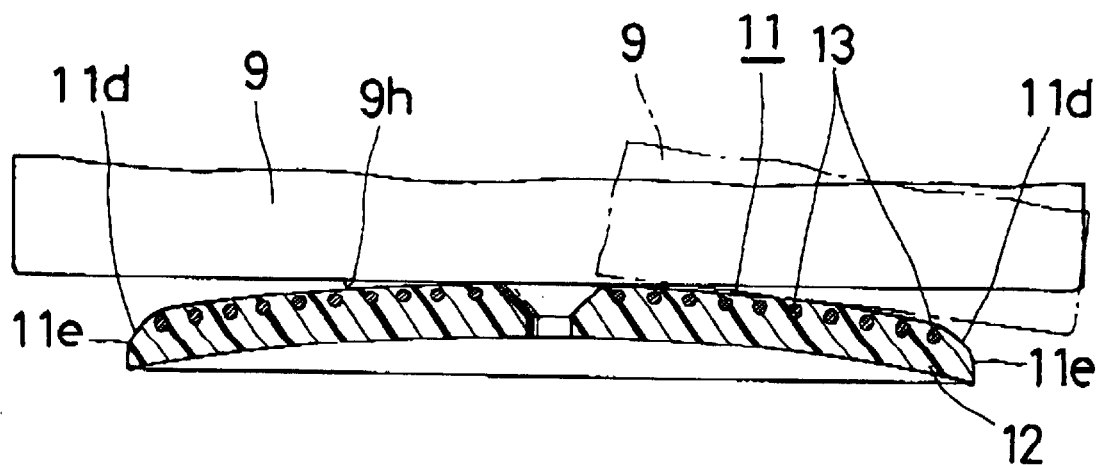
FIG. 15B illustrates a modification of the fixing member shown in FIG. 11.

FIGS. 15A and 15B illustrate still another modified embodiments of the fixing members shown in FIGS. 9 and 11, respectively. In each fixing member 1, 11, the upper surface the peripheral edge 1e, 11e is formed to have a convex curved edge 1d, 11d. The convex curved edge 1d, 11d can keep the distance from the oscillation surface 9h of the induction heating device 9 even if the oscillation surface 9h is disposed on the fixing member 11 in a slanted state as shown in the dot-dash line in FIG. 15B. Furthermore, no conductive multi-aperture sheet exists at the peripheral edge 1e, 11e, resulting in a prevention of deformation of the main member 2, 12. At the same time, the deformation or melting of the waterproof sheet 15 and/or the insulation layer 8 near the peripheral edge 1e, 11e can be prevented. However, the aforementioned function cannot be obtained if the radius of curvature is less than 0.5 mm. It is preferable that the radius exceeds 1.0 mm, and that the maximum radius is approximately the same as the thickness of the fixing member 1, 11.

EXAMPLES

Examples of the waterproof sheet fixing members according to the present invention will be explained with reference to comparative examples. In the following examples, the structure A to be waterproofed has an insulation layer 8 made of polyurethane foam spread on the structural body 7 made of concrete

Example 1

A polypropylene (PP) resin sheet of 3 mm thickness and a metal (stainless steel) mesh as shown in FIG. 3 were disposed one on another, and heat pressed under the pressing force of 10 kg/cm$^2$ to form an integrally laminated sheet. Thereafter, a fixing member having the structure shown in FIGS. 1 and 2 was obtained by punching the laminated sheet into a circular shape having a diameter of 65 mm. The thickness of the wire constituting the stainless steel mesh was 0.5 mm, the opening length of each joining aperture was 2 mm, and the area of each joining aperture was 4 mm$^2$. The opening ratio was 58.4%.

On the insulation layer made of polyurethane foam spread on the ceiling of a building, the fixing members were disposed with the surface near the stainless steel mesh facing upward, and fixed to a structural body of the building by an expandable nail inserted in the anchor insertion hole.

Thereafter, a waterproof sheet made of polypropylene resin (thickness of 1.5 mm) was spread on the structure. Then, an oscillation surface of the induction heating device was disposed on the waterproof sheet right above the fixing member, and a high frequency electromagnetic field (the frequency of 1 MHz) was irradiated while applying a pressure. Thus, the waterproof sheet was welded to the fixing members.

Example 2

As a conductive multi-aperture sheet, the following copper mesh was used. The thickness of the wire constituting the mesh was 0.5 mm. The opening length of each joining aperture was 2 mm, and the area of each joining aperture was 4 mm². The opening ratio was 58.4%. The other conditions were the same as in Example 1.

Example 3

As a conductive multi-aperture sheet, the following aluminum mesh was used. The thickness of the wire constituting the mesh was 0.5 mm. The opening length of each aperture was 2 mm, and the area of each joining aperture was 4 mm². The opening ratio was 58.4%. The other conditions were the same as in Example 1.

Example 4

As a conductive multi-aperture sheet, the following stainless steel punched sheet was used instead of the stainless steel mesh in Example 1. The thickness of the stainless steel punched sheet was 0.1 mm. The area of each joining aperture was 7 mm². The opening ratio was 50%. The other conditions were the same as in Example 1.

Example 5

As a conductive multi-aperture sheet, the following copper punched sheet was used instead of the stainless steel mesh in Example 1. The thickness of the copper punched sheet was 0.1 mm. The area of each joining aperture was 7 mm². The opening ratio was 50%. The other conditions were the same as in Example 1.

Example 6

As a conductive multi-aperture sheet, the following stainless steel punched sheet was used instead of the stainless steel mesh in Example 1. The thickness of the stainless steel punched sheet was 0.1 mm. The area of each joining aperture was 3 mm². The opening ratio was 60%. The other conditions were the same as in Example 1.

Example 7

As a resin sheet constituting a main member, a vinyl chloride resin sheet having a thickness of 3.0 mm was used. As a waterproof sheet, a vinyl chloride resin waterproof sheet having a thickness of 1.5 mm was used. The other conditions were the same as in Example 1.

Example 8

The pressing force of 5 kg/cm² was applied to obtained the fixing member as shown in FIG. 4C. The other conditions were the same as in Example 1.

Example 9

As a conductive multi-aperture sheet, the following stainless steel mesh was used. The thickness of the wire constituting the mesh was 0.5 mm. The opening length of each joining aperture was 0.65 mm, and the area of each joining aperture was 0.42 mm². The opening ratio was 30%. The other conditions were the same as in Example 1.

Example 10

As a conductive multi-aperture sheet, the following stainless steel mesh was used. The thickness of the wire constituting the mesh was 0.5 mm. The opening length of each joining aperture was 3.8 mm, and the area of each joining aperture was 14 mm². The opening ratio was 77%. The other conditions were the same as in Example 1.

Example 11

As a conductive multi-aperture sheet, the following stainless steel mesh was used. The thickness of the wire constituting the mesh was 1.6 mm. The opening length of each joining aperture was 2 mm, and the area of each joining aperture was 4 mm². The opening ratio was 51.3%. The other conditions were the same as in Example 1.

Comparative Example 1

As a fixing member, an iron plate having an upper surface on which polypropylene resin layer was integrally laminated was used. The other conditions were the same as in Example 1.

Comparative Example 2

As a conductive multi-aperture sheet, a stainless steel plate having a thickness of 0.1 mm (with no aperture) was used. The other conditions were the same as in Example 1.

The above examples were evaluated based on the following methods after the fixing operation.

<Joining Strength Evaluation>

A 180-degree peeling examination was performed in accordance with JIS (Japanese Industrial Standard) K6854. In detail, the fixing member and the waterproof sheet welded thereto were cut-out, and the test piece having the peeling width of 20 mm was prepared. Then, the evaluated results are shown in Tables 1 and 2. In the Tables, "⊚(Excellent)" denotes 20 kgf/20 mm or more; "○(Good)" denotes less than 15–20 kgf/20 mm; "Δ(Satisfactory)" denotes less than 10–15 kgf/20 mm, and "x(Unsatisfied)" denotes 10 kgf/20 m or less.

<Appearance Evaluation>

The surface of the waterproof sheet after fixing to the structure was visually observed and sensed by fingers. The evaluation was performed based on the following standard. Then, the evaluated results are shown in Tables 1 and 2. In the Tables, "○" denotes that unevenness could not be recognized by both the visual inspection and touching inspection, and the appearance was good; and "x" denotes that unevenness was recognized by the visual inspection and/or the touching inspection, and the appearance was not good.

<Evaluation of Influence to Insulation Layer>

The existence of a deformation and/or a dented portion of the insulation layer was checked, and the evaluated results are shown in Tables 1 and 2. In the Tables, "○" denotes that no deformation or dented portion was observed; and "x" denotes that some deformations or dented portions were observed.

TABLE 1

| | | Example 1 | Example 2 | Example 3 | Example 4 | Example 5 | Example 6 |
|---|---|---|---|---|---|---|---|
| Conductive multi-aperture sheet | Material Form | Stainless Steel Mesh sheet | Cupper Mesh sheet | Aluminum Mesh sheet | Stainless Steel Punched Sheet | Cupper Punched sheet | Stainless Steel Puncher sheet |
| | Area of Joining Aperature (mm²) | 4 | 4 | 4 | 7 | 7 | 3 |

TABLE 1-continued

|  |  | Example 1 | Example 2 | Example 3 | Example 4 | Example 5 | Example 6 |
|---|---|---|---|---|---|---|---|
|  | Opening ratio (%) | 58.4 | 58.4 | 58.4 | 50 | 50 | 60 |
| Material of main body |  | Polypropylene resin | Polypropylene resin | Polypropylene resin | Polypropylene resin | Polypropylene resin | Polypropylene resin |
| Material of waterproof sheet |  | Polypropylene resin | Polypropylene resin | Polypropylene resin | Polypropylene resin | Polypropylene resin | Polypropylene resin |
| Evaluation | Joint Strength (Kgf/20 mm) | ⊚ | ⊚ | ⊚ | ⊚ | ⊚ | ⊚ |
|  | Surface Appearance | ○ | ○ | ○ | ○ | ○ | ○ |
|  | Influence to Insulation Layer | ○ | ○ | ○ | ○ | ○ | ○ |

TABLE 2

|  |  | Example 7 | Example 8 | Example 9 | Example 10 | Example 11 |
|---|---|---|---|---|---|---|
| Conductive multi-aperture sheet | Material | Stainless Steel | Stainless Steel | Stainless Steel | Stainless Steel | Stainless Steel |
|  | Form | Mesh sheet | Mesh sheet | Mesh sheet | Mesh sheet | Mesh sheet |
|  | Area of Joining Aperature ($mm^2$) | 4 | 4 | 0.42 | 14 | 4 |
|  | Opening ratio (%) | 58.4 | 58.4 | 30 | 77 | 51.3 |
| Material of main body |  | Vinyl chloride resin | Polypropylene resin | Polypropylene resin | Polypropylene resin | Polypropylene resin |
| Material of waterproof sheet |  | Vinyl chloride resin | Polypropylene resin | Polypropylene resin | Polypropylene resin | Polypropylene resin |
| Evaluation | Joint Strength (Kgf/20 mm) | ⊚ | ⊚ | ○ | ○ | ⊚ |
|  | Surface Appearance | ○ | ○ | ○ | ○ | ○ |
|  | Influence to Insulation Layer | ○ | ○ | ○ | ○ | ○ |

TABLE 3

|  |  | Comparative Example 1 | Comparative Example 2 |
|---|---|---|---|
| Evaluation | Joint Strength (kgf/20 mm) | ○ | x |
| Evaluation | Surface Appearance | ○ | ○ |
| Evaluation | Influence to Insulation Layer | x | ○ |

As is apparent from the above, in Examples 1 to 11, sufficient joint strength between the fixing member and the waterproof sheet was obtained, and a good surface appearance was obtained. No influence (deformation, etc.) to the insulation layer was found.

On the contrary, in the Comparative Examples 1 and 2, the joint strength between the fixing member and the waterproof sheet was not enough, and the joint durability was poor. In addition, in Comparative Example 1, the insulation layer was deformed, and therefore, the surface appearance was poor.

Next, in order to observe the influence of the positional relationship between the fixing member and the oscillation surface of the induction heating device, the following experiments were performed under various conditions.

Example 12

A waterproof sheet fixing member shown in FIG. 9 was prepared. The fixing member 1 includes a main body 2 and a conductive multi-aperture sheet 3 embedded in the main body 2, and has an anchor insertion hole 4 at the central portion thereof. The main body 2 was made of polypropylene resin, and has a flat disc shape having a diameter of 65 mm and a thickness of 3.0 mm. The fixing member 1 further includes a spacer on the lower surface of the main body 2 so as to surround the anchor insertion hole 4 and a reinforcing protruded edge 1b at the peripheral edge 1e. The height (h) thereof was 2.0 mm. The conductive multi-aperture sheet 3 was a plain weave mesh member made of stainless wires. The thickness of the wire was 0.5 mm, and the opening ratio of the joining aperture 3a was 58.4%. Furthermore, the conductive multi-aperture sheet 3 was inserted so as to be positioned near the upper surface of the main body 2 by an insert forming method.

Then, as shown in FIG. 10, the above-mentioned plurality of fixing members 1 were disposed on an insulation layer 8 having a thickness of 25 mm in a scattered manner with the upper surface facing upward and fixed to the structural body 7 by way of an insulation layer 8. Each fixing member 1 was fixed by an expandable nail 5 having a length of 50 mm. The nail 5 was inserted into a bore 7a formed in the structural body 7 and secured therein.

A waterproof sheet 15 made of polypropylene having a thickness of 1.5 mm was spread on the structure A. Thereafter, the oscillation surface 9h of the induction heating device 9 was disposed on the waterproof sheet 15 at a portion right above the fixing member 1, and a high frequency electromagnetic field of (500 kHz) was impressed to the fixing member 1 via the waterproof sheet 15 to weld the waterproof sheet 15 to the fixing member 1. The welding operations were performed under the following three different conditions A to C; the center of the oscillation 9h coincided with that of the fixing member 1 (Condition A); the center of the oscillation 9h was slightly shifted (Condition B); and the center of the oscillation 9h was positioned between the center and the peripheral edge of the fixing member 1 (Condition C).

After the welding, the joint status of the fixing member and waterproof sheet was evaluated in the same manner as in the above-mentioned evaluation method. The results are shown in Table 4.

Example 13

As a waterproof sheet fixing member, a fixing member as shown in FIGS. 13A and 13B was used. The fixing member 1 includes a main body 12 and a conductive multi-aperture sheet 13 embedded in the main body 12, and has an anchor insertion hole 14 at the central portion thereof. The main body 2 was made of polypropylene resin, and has a disc shape of a diameter of 65 mm. The fixing member 11 was formed to have a spherical upper surface having a radius of curvature of 267 mm. The fixing member 1 further includes a spacer 11a on the lower surface of the main body 12 so as to surround the anchor insertion hole 14. The conductive multi-aperture sheet 3 was the same mesh member as in Example 12 and was inserted so as to be positioned near the upper surface of the main body 2 by an insert forming method.

Then, as shown in FIG. 12, the above-mentioned plurality of fixing members 11 were disposed on an insulation layer 8 having a thickness of 25 mm in a scattered manner with the upper surface facing upward and fixed to the structural body 7 by way of an insulation layer 8. Each fixing member 11 was fixed by an expandable nail 5 having a length of 50 mm. The nail 5 was inserted into the bore 7a formed in the structural body 7 and secured therein.

A waterproof sheet 15 made of polypropylene having a thickness of 1.5 mm was spread on the structure A. Thereafter, the oscillation surface 9h of the induction heating device 9 was disposed on the waterproof sheet 15 at a portion right above the fixing member 11, and a high frequency electromagnetic field of (500 kHz) was impressed to the fixing member 11 via the waterproof sheet 15 to weld the waterproof sheet 15 to the fixing member 11. The welding operations were performed under the same conditions A to C as applied in Example 12.

After the welding, the joint status of the fixing member and waterproof sheet was evaluated in the same manner as in Example 12. The results are shown in Table 4.

Comparative Example

In this Comparative Example, the same fixing member as in Example 1 was used.

The fixing member 1 was fixed in the same manner as in Example 12, and the waterproof sheet 15 was welded to the fixing member 1 under the same three conditions as in Example 12. After the welding, the joint status of the fixing member 1 and waterproof sheet 15 was evaluated in the same manner as in Examples 12 and 13. The results are shown in Table 4.

As is apparent from Table 4, the fixing members of Examples 12 and 13 according to the present invention were Excellent or Good in each evaluation. To the contrary, the fixing member of Comparative Example was Excellent or Good only under the Condition A, but was unsatisfactory under the Conditions B and C.

TABLE 4

| Evaluation | Example 12 Condition | | | Example 13 Condition | | | Comparative Example Condition | | |
|---|---|---|---|---|---|---|---|---|---|
| | A | B | C | A | B | C | A | B | C |
| Joint strength | ⊚ | ⊚ | ⊚ | ⊚ | ⊚ | ○ | ⊚ | △ | x |
| Surface Appearance | ○ | ○ | ○ | ○ | ○ | ○ | ○ | x | x |
| Influence to Insulation layer | ○ | ○ | ○ | ○ | ○ | ○ | ○ | x | x |

As mentioned above, according to a first aspect of the present invention, a waterproof sheet fixing member for fixing a waterproof thermoplastic resin sheet on a structure to be waterproofed includes a plate-like main member made of a thermoplastic resin; and a conductive multi-aperture sheet having an upper surface and a lower surface, the conductive multi-aperture sheet having a plurality of apertures each communicating the upper surface with the lower surface.

With this fixing member, both the resin of the waterproof sheet and that of the conductive multi-aperture sheet are directly welded by way of the plurality of apertures formed in the conductive multi-aperture sheet, resulting in sufficient joint strength between the main member and the conductive multi-aperture sheet. Furthermore, since the resin near the conductive multi-aperture sheet provided in the fixing member is to be melted by the heat generated in the conductive multi-aperture sheet, heat hardly reaches the outer surface of the waterproof sheet, resulting in a good appearance of the waterproof sheet spread and fixed on the structure.

It is preferable that the conductive multi-aperture sheet is positioned within an upper half depth(thickness) of the main member.

In a case where the conductive multi-aperture sheet is positioned at a portion near an upper surface of the main member, the working ability can be enhanced. Furthermore, since the resin near the conductive multi-aperture sheet melts by heat generated in the conductive multi-aperture sheet, the resin located near the joining surface can be selectively melted, which does not cause any deformation of an insulation layer provided on the structural surface.

In a case where the conductive multi-aperture sheet is positioned within a surface depth(thickness) of 1 mm, only the surface portion of the main member can be selectively heated, and therefore the working ability can be further enhanced.

In a case where an area of each joining aperture falls within a range of from 0.25 to 100 mm$^2$, the joint strength between the fixing member and the waterproof sheet can be further enhanced.

In a case where the opening ratio of said conductive multi-aperture sheet falls within a range of from 20 to 80%, the joint strength between the fixing member and the waterproof sheet can be further enhanced.

In a case where the conductive multi-aperture sheet is a mesh sheet or a punched sheet, the quality of the conductive multi-aperture sheet can be further enhanced, and the manufacturing cost can be reduced.

In a case where a thickness of each wire constituting the mesh sheet falls within a range of from 0.1 to 3 mm, the joint strength between the fixing member and the waterproof sheet can be further enhanced while reducing the manufacturing cost.

In a case where the conductive multi-aperture sheet is made of one of conductive metals including stainless steel, copper, aluminum and iron, the working ability can be further enhanced.

In a case where the main member is made of polyolefin resin, an environmental pollution can be avoided since the resin is superior in recycle ability.

According to a second aspect of the present invention, a waterproof sheet fixing member for fixing a waterproof thermoplastic resin sheet on a structure to be waterproofed includes a plate-like main member made of thermoplastic resin, and a conductive multi-aperture sheet having an upper surface and a lower surface, wherein the conductive multi-aperture sheet has a plurality of apertures each communicating the upper surface with the lower surface. The fixing member further includes an anchor insertion hole provided at a central portion of the main member, a spacer provided on a lower surface of the main member so as to surround the anchor insertion hole, and a reinforcing protruded edge downwardly protruded from a peripheral edge of the main member.

With this waterproof sheet fixing member, the lower surface of the fixing member is hardly heated, and the reinforcing protruded edge is also hardly heated to effectively support the main member which is to be melted. This prevents an excess heating and/or a damage of the waterproof sheet. The spacer prevents a deformation of the fixing member even if an anchor nail is excessively inserted into the structure to which the waterproof sheet is to be fixed. These spacer and reinforcing protruded edge also prevent a deformation of the fixing member due to the pressing force of the high frequency induction heating device at the time of welding the waterproof sheet to the fixing member. This causes a flat surface of the fixing member. Since the conductive multi-aperture sheet is provided with a plurality of joining apertures, the sheet is strongly and integrally laminated to the main member, resulting in an enhanced rigidity of the fixing member.

According to a third aspect of the present invention, a waterproof sheet fixing member for fixing a waterproof thermoplastic resin sheet on a structure to be waterproofed includes a plate-like main member made of thermoplastic resin, and a conductive multi-aperture sheet having an upper surface and a lower surface. The conductive multi-aperture sheet has a plurality of apertures each communicating the upper surface with the lower surface, wherein the conductive multi-aperture sheet is integrally provided in the main member. The fixing member further includes an anchor insertion hole provided at a central portion of the main member, and the main member is formed to have a curved upper surface.

With this waterproof sheet fixing member, since the fixing member contacts the oscillation surface via the waterproof sheet in a state that a spherical surface (i.e., an upper surface of the fixing member) faces a flat surface (i.e., an oscillation surface), the distance between the conductive multi-aperture sheet and the oscillation surface gradually increases toward outside from the contact point. In accordance with the increase of the distance, the generation of heat in the conductive multi-aperture sheet decreases. Thus, an excessive melting of the peripheral edge of the main member will not occur. Even if the oscillation surface contacts the fixing member in an inclined state, the relationship between the spherical surface and the oscillation surface contacted by the spherical surface maintains in the same manner as mentioned above. Since the conductive multi-aperture sheet applied to the fixing member is securely laminated to the main member, and the fixing member has an upper spherical surface, the rigidity of the fixing member is enhanced.

In a case where the fixing member further includes a spacer provided on a lower surface of the main member so as to surround the anchor insertion hole, a deformation of the fixing member can be prevented even if an anchor is excessively inserted. In addition, a deformation of the fixing member due to the pressing force by an induction heating device, can be surely prevented.

In a case where the waterproof sheet fixing member further includes a plurality of reinforcing ledges provided on a lower surface of the main member, wherein the reinforcing ledges radially extend from a portion near the anchor insertion hole, a deformation of the fixing member due to the pressing force by an induction heating device, can be prevented to maintain the spherical surface, resulting in a smooth welding of the waterproof sheet.

In a case where an upper peripheral edge of the main body is formed to have a convex curved edge having a radius of curvature of 0.5 mm or more, the upper peripheral edge will not be excessively heated even if the oscillation surface of the induction heating device is disposed on the fixing member in an inclined state. Accordingly, a partial heat deformation will not occur. As a result, even if the oscillation surface is disposed on the fixing member in a state that the center of the oscillation surface does not coincide with that of the fixing member, the waterproof sheet is effectively prevented from being deformed.

According to a fourth aspect of the present invention, a method of fixing a waterproof thermoplastic resin sheet on a structure to be waterproofed, the method includes the steps of:

preparing a plate-like main member integrally provided with a conductive multi-aperture sheet, wherein the conductive multi-aperture sheet has a plurality of apertures each communicating an upper surface of the main member with a lower surface of the main member;

fixing the main member on a surface of the structure;

disposing the waterproof thermoplastic resin sheet on the surface of the structure; and induction heating the conductive multi-aperture sheet via the waterproof thermoplastic resin sheet to melt a portion where the main member contacts the waterproof thermoplastic resin sheet so that the main member is integrally joined to the waterproof thermoplastic resin sheet.

According to the aforementioned method, the conductive multi-aperture sheet can be directly heated due to the high frequency electromagnetic induction action to melt the thermoplastic resin near the conductive multi-aperture sheet by the induction heating, whereby the fixing sheet and the waterproof sheet can be welded. Since the resin of the fixing sheet and that of the waterproof sheet are directly welded by way of the plurality of joining apertures provided in the conductive multi-aperture sheet, sufficient joining strength between the fixing member and the waterproof sheet can be obtained. Furthermore, since the use of the induction heating enables a selective heating, the waterproof sheet can be fixed with a good surface appearance.

The present invention claims priorities based on Japanese Patent Application No. H10-348053 filed on Dec. 8, 1998 and Japanese Patent Application No. H11-296676 filed on Oct. 19, 1999, the content of which is incorporated hereinto by reference in its entirety.

The terms and descriptions in this specification are used only for explanatory purposes and the present invention is not limited to these, but many modifications and substitutions may be made without departing from the spirit of the scope of the present invention which is defined by the appended claims.

What is claimed is:

1. A waterproof sheet fixing member for fixing a waterproof thermoplastic resin sheet on a structure to be waterproofed, comprising:

a plate-like main member made of thermoplastic resin;

a conductive multi-aperture sheet having an upper surface and a lower surface, said conductive multi-aperture sheet having a plurality of joining apertures each communicating said upper surface with said lower surface, wherein said conductive multi-aperture sheet is integrally provided as a layer in said plate-like main member; and an attachment means which bears on the thermoplastic resin of said plate-like main member at one end is engaged with said structure at the other end.

2. The waterproof sheet fixing member as recited in claim 1, wherein said conductive multi-aperture sheet is positioned within an upper half depth of said main member.

3. The waterproof sheet fixing member as recited in claim 2, wherein said conductive multi-aperture sheet is positioned at a portion near an upper surface of said main member.

4. The waterproof sheet fixing member as recited in claim 3, wherein said conductive multi-aperture sheet is positioned within a surface depth of 1 mm.

5. The waterproof sheet fixing member as recited in claim 1, wherein an area of each of said plurality of joining apertures falls within a range of from 0.25 to 100 mm$^2$.

6. The waterproof sheet fixing member as recited in claim 1, wherein an opening ratio of said conductive multi-aperture sheet falls within a range of from 20 to 80%, said opening ratio being defined as a ratio(%) of a total area of said plurality of joining apertures to a total area of said conductive multi-aperture sheet.

7. The waterproof sheet fixing member as recited in claim 1, wherein said conductive multi-aperture sheet is a mesh sheet.

8. The waterproof sheet fixing member as recited in claim 7, wherein a thickness of each wire constituting said mesh sheet falls within a range of from 0.1 to 3 mm.

9. The waterproof sheet fixing member as recited in claim 1, wherein said conductive multi-aperture sheet is a punched sheet.

10. The waterproof sheet fixing member as recited in claim 1, wherein said conductive multi-aperture sheet is made of one of conductive metals including stainless steel, copper aluminum and iron.

11. The waterproof sheet fixing member as recited in claim 1, wherein said main member is made of polyolefin resin.

12. A waterproof sheet fixing member for fixing a waterproof thermoplastic resin sheet on a structure to be waterproofed, comprising:

a plate-like main member made of thermoplastic resin;

a conductive multi-aperture sheet having an upper surface and a lower surface, said conductive multi-aperture sheet having a plurality of joining apertures each communicating said upper surface with said lower surface, wherein said conductive multi-aperture sheet is integrally provided as a layer in said plate-like main member;

an anchor insertion hole provided at a central portion of said fixing member;

a spacer provided on a lower surface of said main member so as to surround said anchor insertion hole; and a reinforcing protruded edge downwardly protruded from a peripheral edge of said main member; and an anchor bearing surface on the thermoplastic resin of said plate-like main member.

13. The waterproof sheet fixing member as recited in claim 12, wherein said conductive multi-aperture sheet is positioned within an upper half depth of said main member.

14. The waterproof sheet fixing member as recited in claim 13, wherein said conductive multi-aperture sheet is positioned at a portion near an upper surface of said main member.

15. The waterproof sheet fixing member as recited in claim 14, wherein said conductive multi-aperture sheet is positioned within a surface depth of 1 mm.

16. The waterproof sheet fixing member as recited in claim 12, wherein an area of each of said plurality of joining apertures falls within a range of from 0.25 to 100 mm$^2$.

17. The waterproof sheet fixing member as recited in claim 12, wherein an opening ratio of said conductive multi-aperture sheet falls within a range of from 20 to 80%, said opening ratio being defined as a ratio(%) of a total area of said plurality of joining apertures to a total area of said conductive multi-aperture sheet.

18. The waterproof sheet fixing member as recited in claim 12, wherein said conductive multi-aperture sheet is a mesh sheet.

19. The waterproof sheet fixing member as recited in claim 18, wherein a thickness of each wire constituting said mesh sheet falls within a range of from 0.1 to 3 mm.

20. The waterproof sheet fixing member as recited in claim 12, wherein said conductive multi-aperture sheet is a punched sheet.

21. The waterproof sheet fixing member as recited in claim 12, wherein said conductive multi-aperture sheet is made of one of conductive metals including stainless steel, copper, aluminum and iron.

22. The waterproof sheet fixing member as recited in claim 12, wherein said main member is made of polyolefin resin.

23. A waterproof sheet fixing member for fixing a waterproof thermoplastic resin sheet on a structure to be waterproofed, comprising:

a plate-like main member made of thermoplastic resin;

a conductive multi-aperture sheet having an upper surface and a lower surface, said conductive multi-aperture sheet having a plurality of joining apertures each communicating said upper surface with said lower surface, wherein said conductive multi-aperture sheet is integrally provided as a layer in said plate-like main member;

an anchor insertion hole provided at a central portion of said fixing member; and an anchor bearing surface on the thermoplastic resin of said plate-like main member, wherein said main member is formed to have a spherical upper surface.

24. The waterproof sheet fixing member as recited in claim 23, wherein said conductive multi-aperture sheet is positioned within an upper half depth of said main member.

25. The waterproof sheet fixing member as recited in claim 24, wherein said conductive multi-aperture sheet is positioned at a portion near an upper surface of said main member.

26. The waterproof sheet fixing member as recited in claim 25, wherein said conductive multi-aperture sheet is positioned within a surface depth of 1 mm.

27. The waterproof sheet fixing member as recited in claim 23, wherein an area of each of said plurality of joining apertures falls within a range of from 0.25 to 100 mm$^2$.

28. The waterproof sheet fixing member as recited in claim 23, wherein an opening ratio of said conductive multi-aperture sheet falls within a range of from 20 to 80%, said opening ratio being defined as a ratio(%) of a total area of said plurality of joining apertures to a total area of said conductive multi-aperture sheet.

29. The waterproof sheet fixing member as recited in claim 23, wherein said conductive multi-aperture sheet is a mesh sheet.

30. The waterproof sheet fixing member as recited in claim 29, wherein a thickness of each wire constituting said mesh sheet falls within a range of from 0.1 to 3 mm.

31. The waterproof sheet fixing member as recited in claim 23, wherein said conductive multi-aperture sheet is a punched sheet.

32. The waterproof sheet fixing member as recited in claim 23, wherein said conductive multi-aperture sheet is made of one of conductive metals including stainless steel, cupper, aluminum and iron.

33. The waterproof sheet fixing member as recited in claim 23, wherein said main member is made of polyolefin resin.

34. The waterproof sheet fixing member as recited in claim 23, further comprising a spacer provided on a lower surface of said main member so as to surround said anchor insertion hole.

35. The waterproof sheet fixing member as recited in claim 23, further comprising a plurality of reinforcing ledges provided on a lower surface of said main member, said reinforcing ledges radially extending from a portion near said anchor insertion hole.

36. The waterproof sheet fixing member as recited in claim 34, further comprising a plurality of reinforcing ledges provided on a lower surface of said main member, said reinforcing ledges radially extending from a portion near said anchor insertion hole.

37. The waterproof sheet fixing member as recited in claim 12, wherein an upper peripheral edge of said main body is formed to have a convex curved edge having a radius of curvature of 0.5 mm or more.

38. The waterproof sheet fixing member as recited in claim 23, wherein an upper peripheral edge of said main body is formed to have a convex curved edge having a radius of curvature of 0.5 mm or more.

39. A method of fixing a waterproof thermoplastic resin sheet on a structure to be waterproofed, the method including the steps of:

preparing a plate-like thermoplastic resin main member integrally provided with a conductive multi-aperture sheet as a layer in said plate-like main member, wherein said conductive multi-aperture sheet has a plurality of joining apertures each communicating an upper surface of said conductive multi-aperture sheet with a lower surface of said conductive multi-aperture sheet;

fixing said main member on a surface of said structure with use of an attachment means bearing on the thermoplastic resin of said main member;

spreading said waterproof thermoplastic resin sheet on said surface of said structure; and induction heating said conductive multi-aperture sheet via said waterproof thermoplastic resin sheet to melt a portion of thermoplastic resin where said thermoplastic resin main member contacts said waterproof thermoplastic resin sheet so that said thermoplastic resin main member is integrally welded to said waterproof thermoplastic resin sheet.

40. The method as recited in claims 39, said conductive multi-aperture sheet is positioned within an upper half depth of said main member.

* * * * *